United States Patent [19]

Wells

[11] Patent Number: 4,765,573
[45] Date of Patent: Aug. 23, 1988

[54] METHOD OF COMPENSATION FOR FRICTION IN A STABILIZED PLATFORM

[75] Inventor: Brian H. Wells, Chelmsford, Mass.

[73] Assignee: Raytheon Company, Lexington, Mass.

[21] Appl. No.: 43,781

[22] Filed: Apr. 29, 1987

[51] Int. Cl.⁴ ............................................. F42B 15/02
[52] U.S. Cl. ................................... 244/3.15; 244/3.21
[58] Field of Search .................... 244/3.21, 3.15, 3.19; 318/648, 649, 689

[56] References Cited

U.S. PATENT DOCUMENTS

| | | | |
|---|---|---|---|
| 3,984,072 | 10/1976 | Von Pragenau et al. | 244/3.21 |
| 4,037,202 | 1/1977 | Terzian | 364/200 |
| 4,396,878 | 8/1983 | Cole et al. | 244/3.15 |
| 4,508,293 | 4/1985 | Jones | 244/3.15 |
| 4,645,994 | 2/1987 | Giancola et al. | 318/649 |

Primary Examiner—Charles T. Jordan
Attorney, Agent, or Firm—Philip J. McFarland; Richard M. Sharkansky

[57] ABSTRACT

A method of compensating for the difference between static and sliding friction in an inertially stabilized platform is shown to comprise the steps of first detecting when static friction exists and then changing the torque applied to the inertially stabilized platform to eliminate the effect of static friction.

3 Claims, 3 Drawing Sheets

METHOD OF COMPENSATION FOR FRICTION IN A STABILIZED PLATFORM

The Government has rights in this invention pursuant to Contract No. F08635-79-C-0043 awarded by the Department of the Air Force.

BACKGROUND OF THE INVENTION

This invention pertains generally to guided missiles, and particularly to inertially stabilized platforms in such missiles.

It is common in the art to mount the antenna of a radar on an inertially stabilized platform carried by a guided missile (hereinafter sometimes referred to as a "missile") in flight. With such an arrangement the antenna may be stabilized in inertial space regardless of any maneuvering of the missile. Thus, the antenna may be mounted on a double gimbal assembly wherein torque motors are comranded to drive the double gimbal assembly to null the rates sensed by appropriately aligned gyroscopes to effect the desired stabilization.

Unfortunately, friction between parts in the double gimbal assembly and torque motor drives may prevent the degree of nulling required to maintain the position of the boresight line of the antenna in inertial space. Any such motion of the antenna in inertial space due to friction is taken by the guidance system to mean that the target has moved. As a result, then, guidance command signals are generated to cause unwanted maneuvering of the missile.

The problem is exacerbated when the size and inertia of the components of the guidance system are reduced. The torque available to achieve nulling is also reduced because the torque motors are necessarily smaller so that additional gearing may be required between each torque motor and the associated one of the gimbals in the dual gimbal assembly to provide sufficient torque. It will be appreciated that friction in the additional gearing may adversely affect performance. In particular, as the gimbal rate decreases toward zero from either direction, a point is reached where the friction increases to such a degree that insufficient torque is applied to effect a desired movement. The result is that an error in the sensed line of sight rate appears, making it seem to the guidance system that the target has maneuvered even though no maneuver has actually occurred. Guidance command signals then are generated to counteract a nonexistent maneuver of the target, thus causing the missile to be incorrectly guided. In the terminal phase of flight of a missile any error in guidance is to be avoided because it may not be possible to complete corrective maneuvers before intercept.

SUMMARY OF THE INVENTION

With the foregoing in mind, it is a primary object of this invention to provide a method of operating a guidance system in a missile to avoid the deleterious effect of friction in elements of such system.

Another object of this invention is to meet the objective mentioned above in a simple and straightforward manner.

BRIEF DESCRIPTION OF THE DRAWINGS

The foregoing and other objects of this invention are generally attained in a guidance system incorporating an inertially stabilized platform for an antenna by changing the antenna rate command signals applied to the stabilized platform so that the effect of any change in the coefficient of friction between elements in the stabilized platform is compensated.

For a more complete understanding of this invention, reference is now made to the following description of the accompanying drawings in which.

DESCRIPTION OF THE PREFERRED EMBODIMENT

It will be noted here that the contemplated method may be implemented in any one of a great number of radar controlled guidance systems. It is felt, therefore, that conventional mechanical and electrical details not essential to an understanding of the invention need not be shown in any detail.

Figure 1:
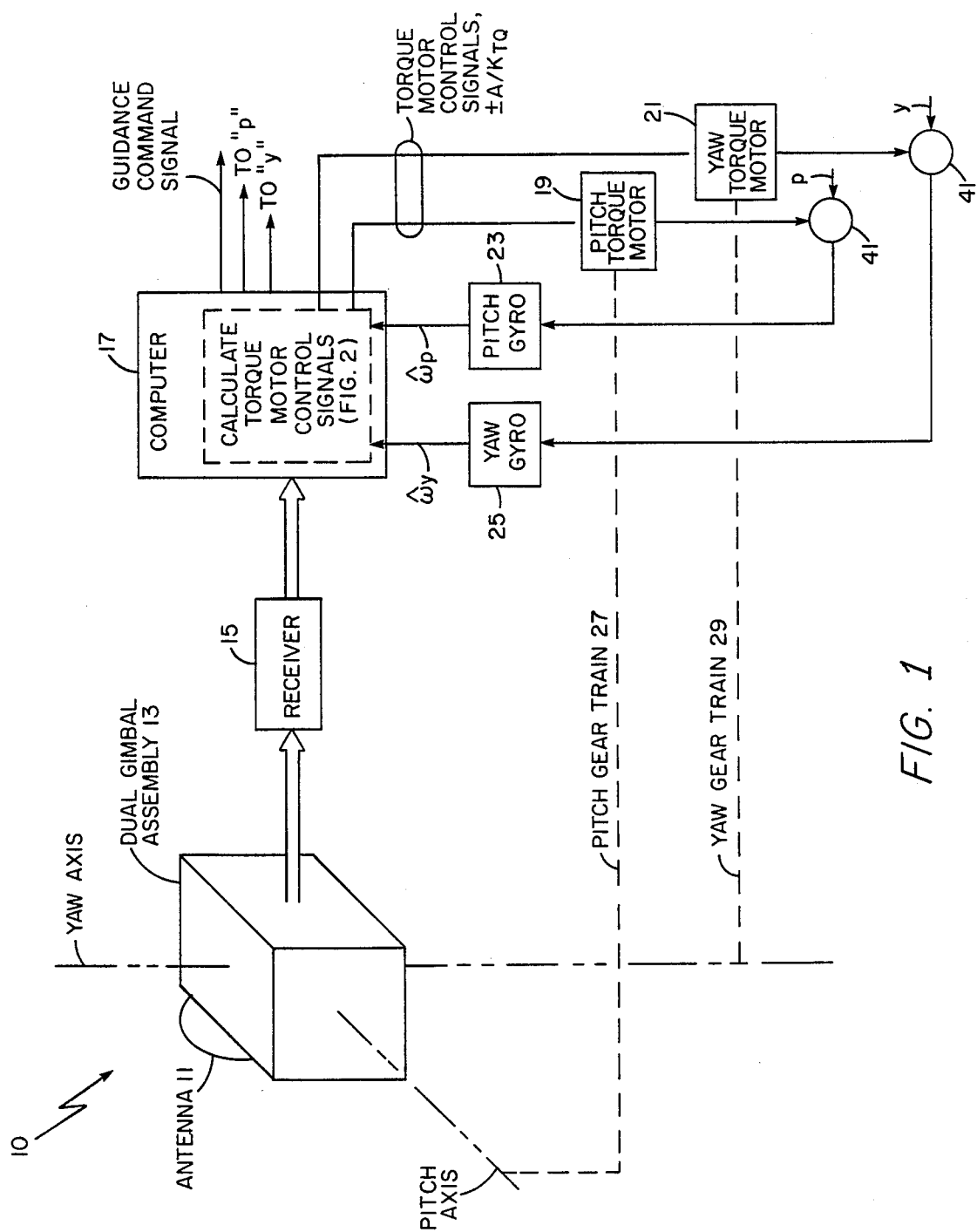
FIG. 1 is a sketch, greatly simplified, of a guidance system incorporating a radar antenna mounted on a dual gimbal assembly.

Referring now to FIG. 1, it may be seen that the contemplated method may be incorporated in a known guidance system 10 made up of conventional known elements. Such system thus generally comprises: (a) an antenna 11 mounted on a dual gimbal assembly 13; (b) a receiver 15 and a computer 17 to process signals out of the antenna 11 to provide guidance command signals for control elements (not shown), torque motor control signals for a pitch torque motor 19 and a yaw torque motor 21 and missile body motion signals "p" and "y"; (c) a pitch gyroscope (pitch gyro 23) and a yaw gyroscope (yaw gyro 25); and (d) a pitch gear train 27 and a yaw gear train 29 (or similar mechanical linkages) disposed between the pitch and yaw torque motors 19, 21 and the dual gimbal assembly 13. The computer 17 may, for example, be a digital computer such as is shown in U.S. Pat. No. 4,037,202, issued July 19, 1977 and assigned to the same assignee as this application.

Figure 2:
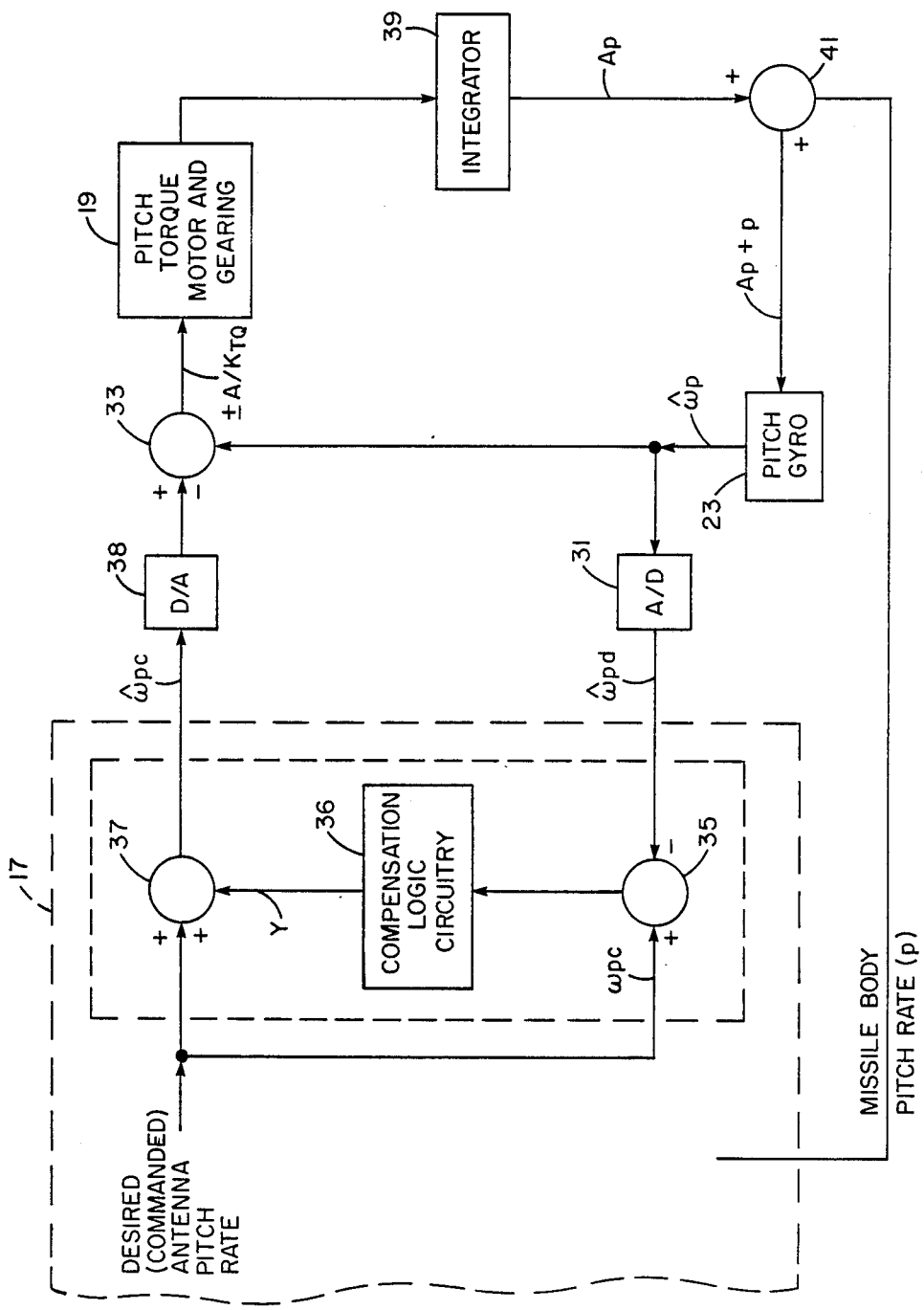
FIG. 2 is a sketch showing how control signals for the torque motor controlling one of the gimbals in the dual gimbal assembly may be derived in accordance with the contemplated method.
Figure 3:
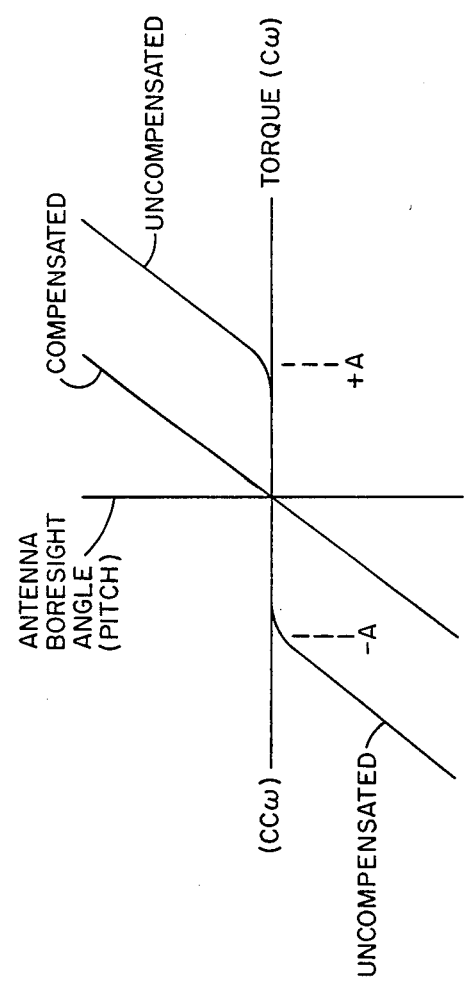
FIG. 3 is a sketch illustrating how friction may adversely affect operation of the guidance system shown in FIG. 1 and how the contemplated method overcomes any adverse effect of friction.

Referring now to FIGS. 2 and 3, it may be seen that the computer 17 (FIG. 1) is adapted to generate in a conventional manner a signal, $\omega_{pc}$, representative of the pitch rate command for the antenna 11 (FIG. 1). Such signal, when differenced with the measured antenna rate $\dot{\omega}_p$ in a known system, produces the pitch tcrque motor control signal. A response curve such as the curve labeled "UNCOMPENSATED" in FIG. 3 then would result. Thus, in a known system there is a "dead zone" as indicated between $+A$ and $-A$ in FIG. 3 in which no motion occurs even though torque is applied. In the "dead zone", then, a tracking error is experienced causing unwanted changes in the guidance command signals (FIG. 1). The contemplated method, however, produces a response curve such as the curve marked "COMPENSATED" in FIG. 3, meaning there is no "dead zone." With the "dead zone" eliminated, no false guidance command signals (FIG. 1) are produced.

The arrangement shown in FIG. 2, the measured antenna rate $\dot{\omega}_p$, i.e., the measured antenna rate produced by a pickoff (not shown) on the pitch gyro 23, is applied to an analog-to-digital converter (A/D 31) and to a differencing circuit 33. The antenna rate command $\omega_{pc}$ and the output $\dot{\omega}_{pd}$ of the A/D 31 are applied to a differencing circuit 35 to produce a control signal for compensation logic circuitry 36 wherein any inequality between the two signals ($\omega_{pc}$ and $\hat{\omega}_{pd}$) is sensed. The compensation logic circuitry 36 operates in accordance with the following:

$$X = \omega_{pc} - \hat{\omega}_{pd}$$

IF $X > 0 (Y = A/K_{TQ})$

ELSE $(Y = -A/K_{TQ})$; END IF

The antenna pitch rate command $\omega_{pc}$ and the output, Y, of the compensation circuit 36 are applied to a summing circuit 37 to produce a sum signal $\hat{\omega}_{pc}$ which is applied to a digital-to-analog converter (D/A 38) to transform $\hat{\omega}_{pc}$ to analog form as the second input signal to the differencing circuit 33. The output of the differencing circuit 33 then is the pitch torque motor control signal $\pm A/K_{TQ}$ to the pitch torque motor 19 (FIG. 1). A is a factor that is related to the static friction in the pitch gear train 27 and that may be determined by prior measurement. $K_{TQ}$ is a torque parameter that may be determined by prior measurement. The pitch torque motor control signal $\pm A/K_{TQ}$ is applied to an integrator 39 to be converted to a signal $A_p$ representative of the angular velocity (in the pitch plane) of the antenna 11 (FIG. 1). The signal $A_p$ is added in a summing circuit 41 to a signal p representative of the missile body pitch rate to produce a precession control signal $A_p + p$ for the pitch gyro 23. It will now be apparent to one of skill in the art that the just described arrangement constitutes a stabilization loop wherein a "dead zone" due to static friction is eliminated.

Having described a preferred embodiment of this invention, it will now be clear to one of skill in the art that changes may be made without departing from the inventive concepts. For example, it will be noted that the compensation logic circuitry 36 may simply be a switching arrangement controlled in accordance with the logic set forth hereinbefore to change the torque motor control signal (when that motor is not rotating) to overcome static friction. Further, it will be evident that a second similar stabilization loop for the yaw gyro 25 or an appropriate switching arrangement to allow the pitch gyro 23 and the yaw gyro 25 to share a single stabilization loop could be provided. It is felt, therefore, that this invention should not be restricted to its disclosed embodiment, but rather should be limited only by the spirit and scope of the appended claims.

What is claimed is:

1. In the operation of a guidance system for a missile in flight to intercept a target, such system including an antenna mounted on an inertially stabilized dual gimbal assembly, each gimbal in such assembly being rotatable about an axis by rotation of an associated torque motor operating through a mechanical drive mechanism, there being a substantial difference between the static and sliding friction of each torque motor and mechanical drive mechanism and the rotation of each torque motor being controlled to null the rate sensed by an associated gyroscope, the method of supplying a control signal to each torque motor to compensate for the substantial difference between the static and sliding friction, such method comprising the steps of:

(a) detecting the difference between a rate signal generated by a gyroscope and a rate command signal to provide a first control signal when the rate signal is greater than the rate command signal and a second control signal when the rate signal is equal to, or less than, the rate command signal;

(b) generating, in response to the first control signal, a first compensation signal having a first polarity and, in response to the second control signal, a second compensation signal having a second polarity; and (c) applying the first and the second compensation signal to the associated torque motor to counteract the static friction.

2. The method as in claim 1 wherein the rate signal generated by the gyroscope is converted to a first digital signal and the rate command signal is a second digital signal.

3. The method as in claim 2 wherein the first and the second compensation signal each is converted from a third and a fourth digital signal to a first and a second analog signal.

* * * * *